US 12,454,445 B2

(12) United States Patent
Van Der Berg et al.

(10) Patent No.: US 12,454,445 B2
(45) Date of Patent: Oct. 28, 2025

(54) CABLE WINCH

(71) Applicant: INFRAVISION HOLDINGS PTY LTD, New South Wales (AU)

(72) Inventors: Cameron Van Der Berg, New South Wales (AU); Daniel Van Der Berg, New South Wales (AU)

(73) Assignee: INFRAVISION HOLDINGS PTY LTD., Camperdown (AU)

( * ) Notice: Subject to any disclaimer, the term of this patent is extended or adjusted under 35 U.S.C. 154(b) by 0 days.

(21) Appl. No.: 18/031,791

(22) PCT Filed: Jul. 29, 2022

(86) PCT No.: PCT/AU2022/050810
§ 371 (c)(1),
(2) Date: Apr. 13, 2023

(87) PCT Pub. No.: WO2023/004472
PCT Pub. Date: Feb. 2, 2023

(65) Prior Publication Data
US 2023/0382695 A1    Nov. 30, 2023

(30) Foreign Application Priority Data

Jul. 30, 2021   (AU) ............................... 2021902353
Aug. 3, 2021   (AU) ............................... 2021902386
(Continued)

(51) Int. Cl.
*B66D 1/50*   (2006.01)
*B66D 1/24*   (2006.01)
(Continued)

(52) U.S. Cl.
CPC ............... *B66D 1/505* (2013.01); *B66D 1/24* (2013.01); *H02G 1/04* (2013.01); *B64U 10/60* (2023.01);
(Continued)

(58) Field of Classification Search
CPC . B66D 1/505; B66D 1/24; B66D 1/38; B66D 2700/0141; H02G 1/04; B64U 10/60; B64U 2101/00
(Continued)

(56) References Cited

U.S. PATENT DOCUMENTS 3,653,636 A * 4/1972 Burrell .................... E21B 19/09
254/270
5,398,911 A * 3/1995 Holster .................. B65G 23/44
254/350
(Continued)

FOREIGN PATENT DOCUMENTS

AU   2021215247   3/2022
CN   213063536   4/2021
(Continued)

OTHER PUBLICATIONS

Berga Andre (JP H08508829 A), Method And Apparatus For Applying A Flat Ribbon Around A Cylindrical Core (Year: 1996).*
(Continued)

*Primary Examiner* — Jorge L Carrasquillo
(74) *Attorney, Agent, or Firm* — Ballard Spahr LLP

(57) ABSTRACT

A cable winch (100) for deploying and retracting a cable (50) during the installation of powerline cables on transmission towers. The cable winch (100) includes a base frame (102), a spool (110), a drive system (120), a sensor system (200), and a control system (300). The spool (110) is mounted for rotation on the base frame (102) and the cable (50) is releasably securable to the spool (110). The drive
(Continued)

system (120) is able to drive rotation of the spool (110) to either pay out or wind in the cable (50) along a cable path. The cable path passes through the sensor system (200), which has a first sensor (244) able to detect and output tension data in relation to the tension in the cable (50) passing through the sensor system (200). The control system (300) is adapted to receive the tension data output by the sensor system (200) and modulate the speed and torque of the drive system (120) in order to maintain a predetermined tension in the cable (50).

14 Claims, 6 Drawing Sheets

(30) Foreign Application Priority Data

| | | | |
|---|---|---|---|
| Sep. 22, 2021 | (AU) | ............................... | 2021903054 |
| Dec. 9, 2021 | (AU) | ............................... | 2021903983 |

(51) Int. Cl.
| | |
|---|---|
| *H02G 1/04* | (2006.01) |
| *B64U 10/60* | (2023.01) |
| *B64U 101/00* | (2023.01) |
| *B66D 1/38* | (2006.01) |

(52) U.S. Cl.
CPC ............ *B64U 2101/00* (2023.01); *B66D 1/38* (2013.01); *B66D 2700/0141* (2013.01)

(58) Field of Classification Search
USPC .......................................................... 318/6
See application file for complete search history.

(56) References Cited

U.S. PATENT DOCUMENTS

| | | | |
|---|---|---|---|
| 8,622,744 B2 | 1/2014 | Lumry et al. | |
| 10,763,648 B2 | 9/2020 | Seekell | |
| 10,998,700 B1 | 5/2021 | Seekell | |
| 11,254,551 B2 | 2/2022 | Fulk et al. | |
| 11,476,596 B1 | 10/2022 | Seekell | |
| 11,541,994 B2 | 1/2023 | Clarke | |
| 11,597,506 B2 | 3/2023 | Clarke et al. | |
| 11,604,448 B2 | 3/2023 | Datta et al. | |
| 11,619,797 B2 | 4/2023 | Some et al. | |
| 11,787,038 B2 | 10/2023 | Clarke et al. | |
| 11,843,229 B2 | 12/2023 | Seekell | |
| 2009/0127525 A1 | 5/2009 | Teurlay et al. | |
| 2012/0250010 A1 | 10/2012 | Hannay | |
| 2017/0259941 A1* | 9/2017 | Briggs, IV | ............. B66D 1/505 |
| 2019/0203575 A1* | 7/2019 | Schlosser | ............. E21B 19/008 |
| 2019/0212131 A1 | 7/2019 | Spencer et al. | |
| 2019/0359328 A1 | 11/2019 | Clarke et al. | |
| 2020/0017340 A1* | 1/2020 | Fuehrle | .................... B66D 1/46 |
| 2020/0317330 A1 | 10/2020 | Clarke et al. | |
| 2020/0324887 A1 | 10/2020 | Clarke | |
| 2021/0006412 A1 | 1/2021 | Gahlinger | |
| 2021/0101277 A1 | 4/2021 | Seekell | |
| 2021/0268640 A1 | 9/2021 | Clarke et al. | |
| 2022/0281600 A1 | 9/2022 | Wabnegger et al. | |
| 2022/0406158 A1 | 12/2022 | Mahmoud et al. | |
| 2023/0047691 A1 | 2/2023 | Seekell | |

FOREIGN PATENT DOCUMENTS

| | | |
|---|---|---|
| EP | 4064642 | 9/2022 |
| GB | 2309952 | 4/1996 |
| TW | 201939062 | 1/2019 |
| TW | 201939063 | 1/2019 |
| TW | 1662289 | 6/2019 |
| WO | 2021126071 A1 | 6/2021 |

OTHER PUBLICATIONS

International Search Report and Written Opinion were mailed on Sep. 19, 2022 by the International Searching Authority for International Application No. PCT/AU2022/050810 filed on Jul. 29, 2022 and published as WO2023004472 (Applicant–Infravision Holdings Pty Ltd) (10 pages).

International Preliminary Report on Patentability was issued on Jan. 18, 2024 by the International Searching Authority for International Application No. PCT/AU2022/050810 filed on Jul. 29, 2022 and published as WO2023004472 (Applicant—Infravision Holdings Pty Ltd) (7 pages).

EP Extended Examination Search Report dated Jun. 16, 2025 for European Counterpart Application No. 22847729.5.

* cited by examiner

CABLE WINCH

CROSS REFERENCE TO RELATED APPLICATIONS

This application is a national phase filing under 35 U.S.C. § 371 of International Application No. PCT/AU2022/050810, filed Jul. 29, 2022, which claims priority to and the benefit of AU application No. 2021902353, filed Jul. 30, 2021, AU Application No. 2021902386, filed Aug. 3, 2021, AU application No. 2021903054, filed Sep. 22, 2021, and AU application No. 2021903983, filed Dec. 9, 2021. Each of these applications is incorporated herein by reference in its entirety.

TECHNICAL FIELD

The present disclosure relates to a cable winch for deploying and retracting cables. In particular, the present invention relates to a cable winch for deploying and retracting pilot cables and high voltage power cables in a power line stringing operation.

BACKGROUND OF THE INVENTION

Reference to any prior art in the specification is not an acknowledgement or suggestion that this prior art forms part of the common general knowledge in any jurisdiction or that this prior art could reasonably be expected to be combined with any other piece of prior art by a skilled person in the art.

Stringing high voltage power lines to transmission towers is a difficult, dangerous, and time-consuming operation involving helicopters, cable winches, and a large work force of dozens of workers, some of them very highly skilled such as pilots, in the field.

Using helicopters in close proximity to transmission towers is inherently very dangerous as sudden wind gusts can cause accidents with catastrophic consequences. The resources required and cost to conduct such an operation are also immense due to the total number of man hours needed, the high levels of expertise required, the running costs for the helicopter and other equipment, the safety requirements, etc. Helicopters have traditionally been required to perform the power line stringing operation because of the weight of the power line cables, which require powerful aircraft to lift the cables and the ability to hover over the transmission tower while the cable is installed.

Helicopters typically draw the high voltage electricity cable from a cable spool on a winch located on the ground. Typically, the winch allows the cable to be unspooled as the helicopter draws the cable from the winch. While some winches are able to limit the speed at which the cable is deployed, conventional winches are unable to actively control the tension on the cable as it is drawn from the winch by the helicopter.

Using a drone in place of a helicopter is one option to address the issues associated with using a helicopter. However, in order to accurately operate a drone carrying a cable, the tension on the cable needs to be carefully controlled so as to maintain a relatively constant tension on the cable.

It is therefore desirable to provide a cable winch that is able to control the tension on the cable being deployed and maintain a relatively constant tension on the cable.

OBJECT OF THE INVENTION

It is an object of the present invention to substantially overcome or at least ameliorate one or more of the above disadvantages, to meet the above desire, or to provide a useful alternative to the prior art.

SUMMARY OF THE INVENTION

In a first aspect, the present invention provides a cable winch adapted to deploy and retract a cable during the installation of powerline cables on transmission towers, the winch comprising:
 a base frame;
 a spool mounted for rotation on the base frame, the cable being releasably securable to the spool and extending through the cable winch along a cable path;
 a drive system connected to the spool and able to drive rotation of the spool to either pay out or wind in the cable along the cable path;
 a sensor system arranged on the cable path through which the cable passes downstream of the spool, the sensor system having a first sensor able to detect and output tension data in relation to the tension in the cable passing through the sensor system; and
 a control system adapted to receive the tension data output by the sensor system and modulate the speed and torque of the drive system in order to maintain a predetermined tension in the cable.

By way of clarification and for avoidance of doubt, as used herein and except where the context requires otherwise, the term "comprise" and variations of the term, such as "comprising", "comprises" and "comprised", are not intended to exclude further additions, components, integers or steps.

BRIEF DESCRIPTION OF THE DRAWINGS

A preferred embodiment of the invention will now be described by way of specific example with reference to the accompanying drawings, in which.

DETAILED DESCRIPTION OF THE PREFERRED EMBODIMENTS

The present disclosure provides a cable winch (100) for deploying (paying out) and/or retracting (winding in) a cable (50) that is able to control the tension on the cable (50) being paid out or wound in by detecting various parameters of the cable deployment/retraction and adjusting the speed of the winch (100) to maintain a predetermined tension on the cable (50).

Figure 1:
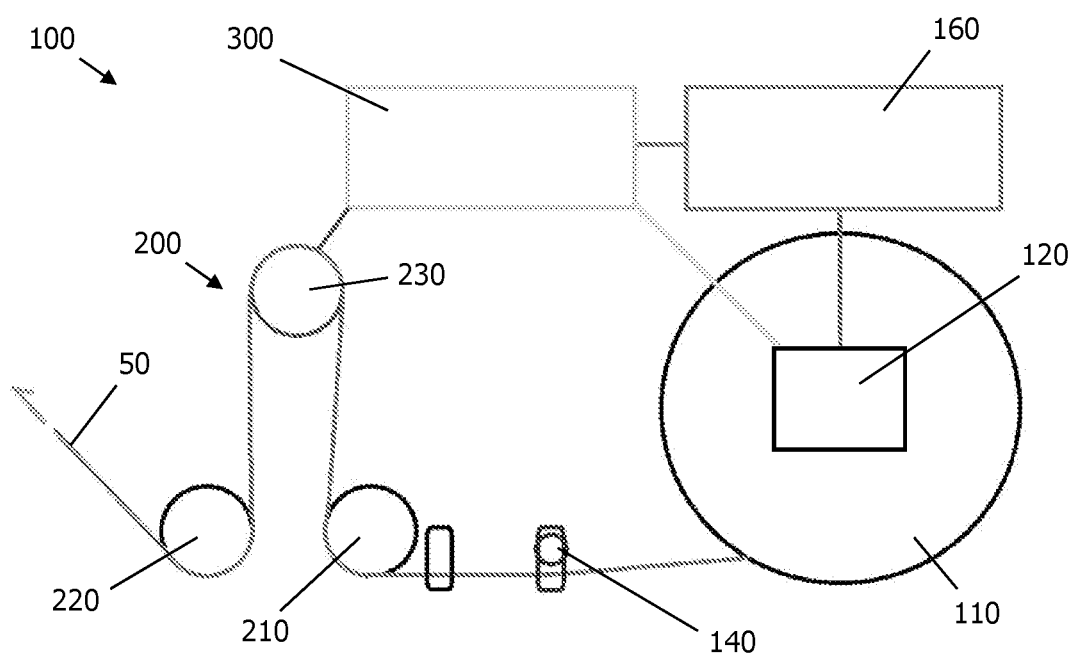
FIG. 1 is a schematic representation of a cable winch.

A schematic diagram of the cable winch (100) is depicted in FIG. 1, showing the basic components. The cable winch (100) includes a spool (110), driven by a drive system (120), a power supply (160), a level wind (140), a sensing sheave system (200), and a control system (300) in the form of a programmable logic controller [PLC] with a human machine interface [HMI]. The control system (300) receives sensor data on the speed and tension of the cable (50) passing through the sensing sheave system (200) and controls the speed and torque of the drive system (120) to maintain a predetermined tension on the cable (50). When discussing the arrangement of components in the cable winch (100), the term "downstream" refers to something located further along the path of the cable (50) in the paying out direction, i.e. further from the spool (110). Conversely, the term "upstream" refers to something further along the path of the cable (50) in the winding in direction, i.e. closer to the spool (110).

Figure 2:
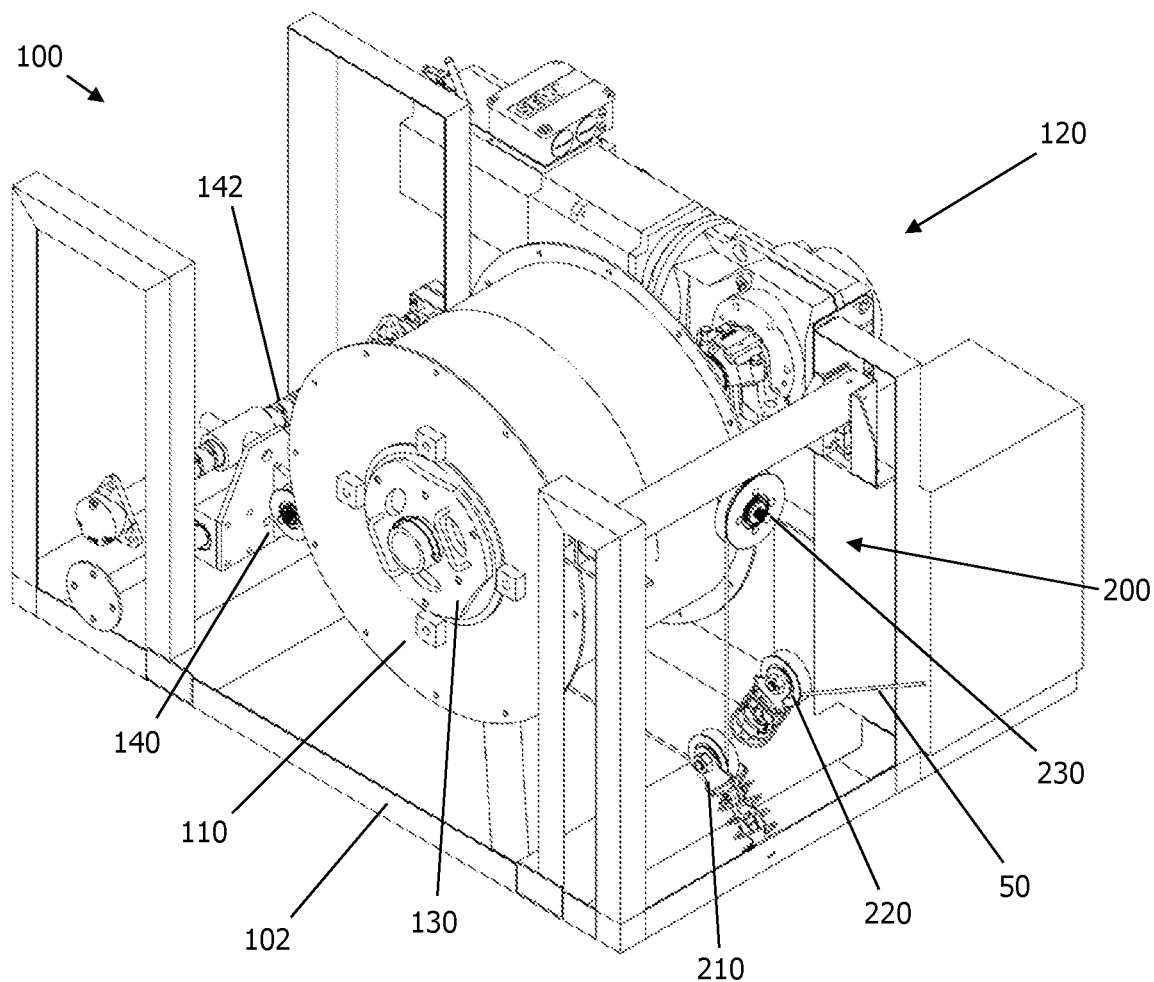
FIG. 2 depicts a cable winch.

One preferred embodiment of the cable winch (100) is depicted in FIGS. 2 to 6. Referring to FIG. 2, the cable winch (100) includes a base frame (102), a multi-wrap winch spool (110), mounted for rotation on the base frame (102), a drive system (120) for driving rotation of the spool (110), a brake system (130) for retarding rotation of the spool (110), a level wind (140) for winding a cable (50) onto and off of the spool (110), a sensing sheave system (200) for sensing the tension and speed of the cable (50), and a control system (300). The control system (300) operates in communication with the sensing sheave system (150), the drive system (120), and the brake system (130) in order to control the torque and speed of the drive system (120) based on feedback from the sensing sheave system (200).

Figure 3:
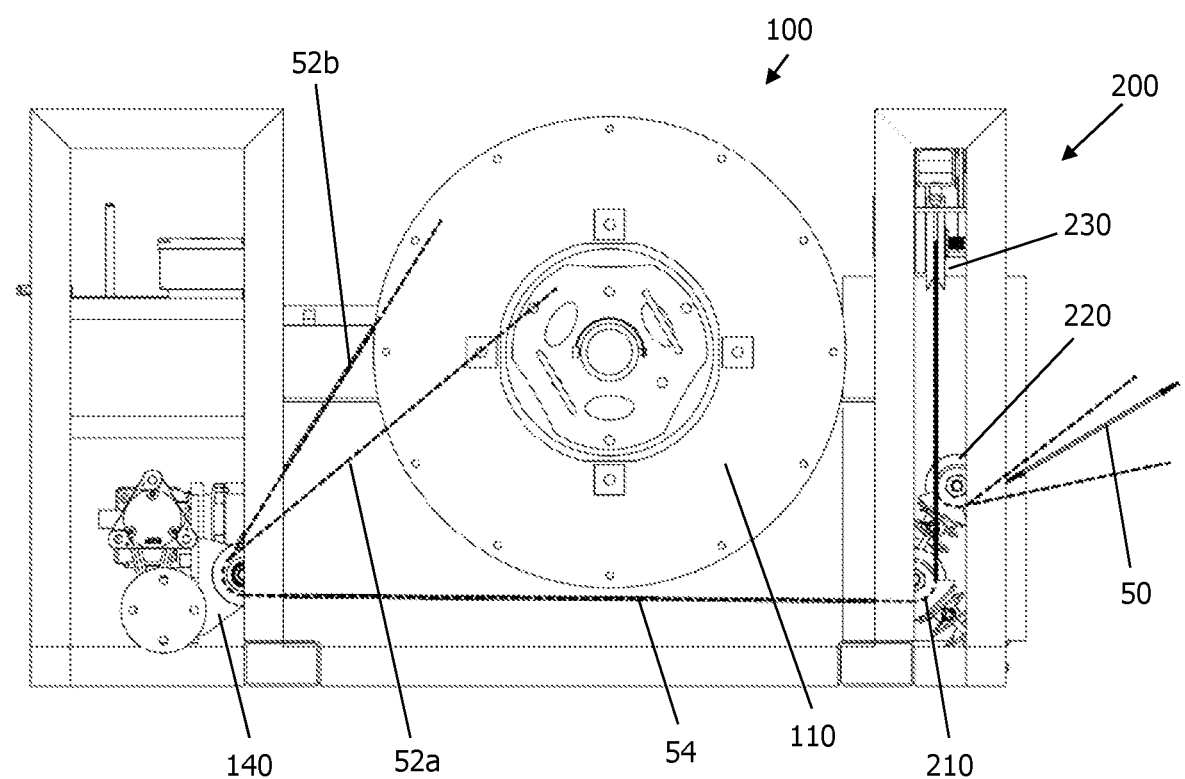
FIG. 3 is a side elevation view of the cable winch of FIG. 2.
Figure 4:
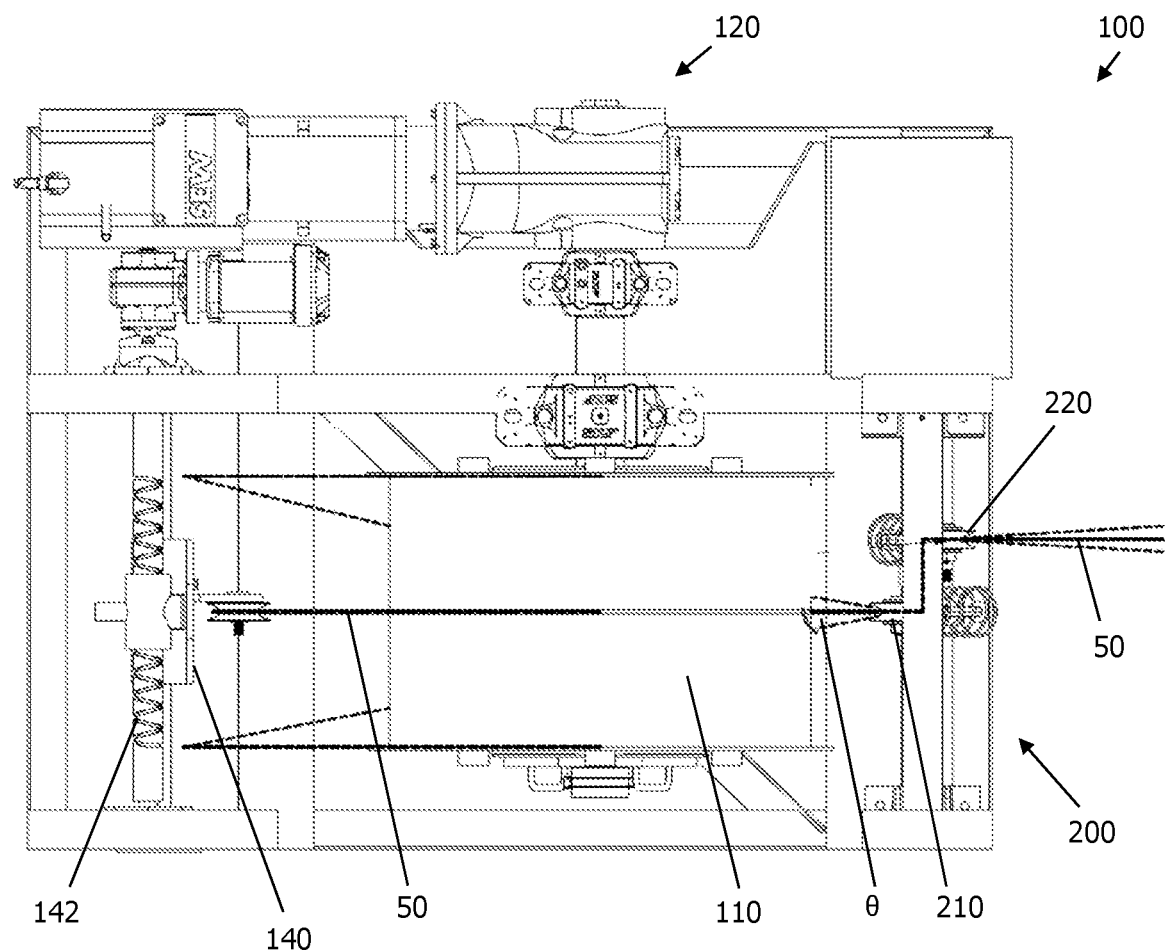
FIG. 4 is a top plan view of the cable winch of FIG. 2.

As best shown in FIGS. 3 and 4, the cable (50) is wound onto and paid out from the spool (110) via the level wind (140). This section of cable between the spool (110) and the level wind (140) is referred to herein as the inner cable portion (52). As the cable (50) is paid out from or wound onto the spool (110), the level wind (140) is driven to translate to and fro along a helically grooved shaft (142), best shown in FIG. 4. This delivers the inner cable portion (52) onto the spool (110) and receives the inner cable portion (52) from the spool (110) consistently in a direction that is perpendicular to the axis of rotation of the spool (110), while constantly moving laterally from one side of the spool (110) to the other and back again. This ensures that the cable (50) is wound onto the spool (110) in tightly wound, evenly distributed coils, layered one over the other.

FIG. 1 shows a full spool (110) onto which many layers of cable have been spooled. As the cable is paid out, the thickness of layered cable stored on the spool (110) reduces until all of the cable is paid out from the spool (110). In FIG. 2, two different representations of the inner cable portion (52a, 52b) extending from the spool (110) to the level wind (140) are depicted. The lower line shows the inner cable portion (52a) extending from the level wind (140) to the surface of an empty spool (110) and the upper line shows the inner cable portion (52b) extending from the level wind (140) to the outermost layer of spooled cable on a full spool (110).

As best depicted in FIG. 4, in order to allow very fast and accurate control of both speed and torque, the drive system (120) comprises two synchronous torque motors with pulse width modulation (PWM) variable frequency drives (VFD). One motor and drive controls rotation of the spool (110) and the other motor and drive controls operation of the level wind (140).

Traditional cable pull winches and tensioners typically use hydraulic power trains which have the ability to vary their speed from nominal to zero at full torque. They also "bleed off" waste mechanical energy as heat via radiators. These features are an inherent benefit of a hydraulic system however hydraulic systems do not provide accurate high-speed torque and speed control based on the hydraulic system dynamic constraints.

Electric drive systems do allow accurate control of speed and torque, however, they do not inherently possess the above characteristics of a hydraulic system. AC squirrel cage motors have a near constant speed profile with torque increasing sharply as the speed drops below nominal under load. The use of a variable frequency drive (VFD) increases the working speed range of an AC motor and allows the full torque to be generated across a wide rpm range, however; the performance range of a VFD is limited and will not allow the fine control of speed and torque near zero rpm as required for control of the cable winch.

Servo and synchronous torque motors operate in a similar manner to a DC motor. However, instead of the rotation of the shaft and changing polarity of the bushes creating the torque, the torque is created and regulated by a motor drive controller in the form of a VFD. This controller uses a shaft encoder and other inputs to regulate the voltage, current, and frequency to ensure the desired torque and rpm are achieved. These motors have more poles and can be force cooled which greatly increases their operating range.

The motor drive is responsible for direct control of the motor. This is achieved by varying the current, voltage and/or frequency of the motor power supply such that the torque and speed are modulated as required. Without external sensor input, the drive system (120) is an open-loop system and cannot adapt precisely to the changing spool diameter to ensure the line tension and speed is controlled adequately. The drive system (120) can react to a change in tension as this will manifest as a change in torque, however without external input the target torque will not be accurate.

The sensing sheave system (200) receives cable from the level wind (140) as cable is paid out from the spool (110) and delivers cable to the level wind (140) as cable is wound in. This section of cable between the level wind (140) and the sensing sheave system (200) is referred to herein as the central cable portion (54), shown best in FIG. 4.

The sensing sheave system (200) comprises an inner alignment sheave (210), an outer alignment sheave (220), and a sensing sheave (230). The sensing sheave (230) is connected to sensors that are able to measure the tension and speed of the cable (50) as it passes through the sensing sheave (230).

As the cable (50) runs in a pay out direction, the cable (50) travels from the level wind (140) to the inner alignment sheave (210), from the inner alignment sheave (210) to the sensing sheave (230), and from the sensing sheave (230) to the outer alignment sheave (220), before exiting the winch (100). The inner alignment sheave (210) is fixed relative to the base frame (102), while the level wind (140) oscillates along the helically grooved shaft (142). This means that the angle of incidence (θ) of the central cable portion (54) entering the inner alignment sheave (210) is constantly varying between zero when the level wind is centred and $+/-\theta_x$, where ex is the angle of incidence when the level wind (140) is at one of the extremities of its oscillation. This is important because as the angle $\theta_x$ increases, the tension measurements of the sensing sheave (230) are increasingly compromised by the effects of localised torque on the cable (50). Therefore, in order to ensure accurate tension measurements from the sensing sheave, the angle $\theta_x$ should be minimised. Preferably, the angle of incidence $\theta_x$ should be kept below an angle of at least 15°, and preferably below approximately 12°, in order to avoid problematic distortion of the tension measurements.

By increasing the distance between the level wind (140) and the inner alignment sheave (210), the maximum angle of incidence $\theta_x$ can be reduced. In order to provide a greater distance between the level wind (140) and the inner alignment sheave (210), the level wind (140) and the sensing sheave system (200) have been located on opposite sides of the spool (110), with the central cable portion (54) passing beneath the spool (110). This maximises the distance between the level wind (140) and the inner alignment sheave (210), while maintaining a compact footprint for the cable winch (100).

Figure 5:
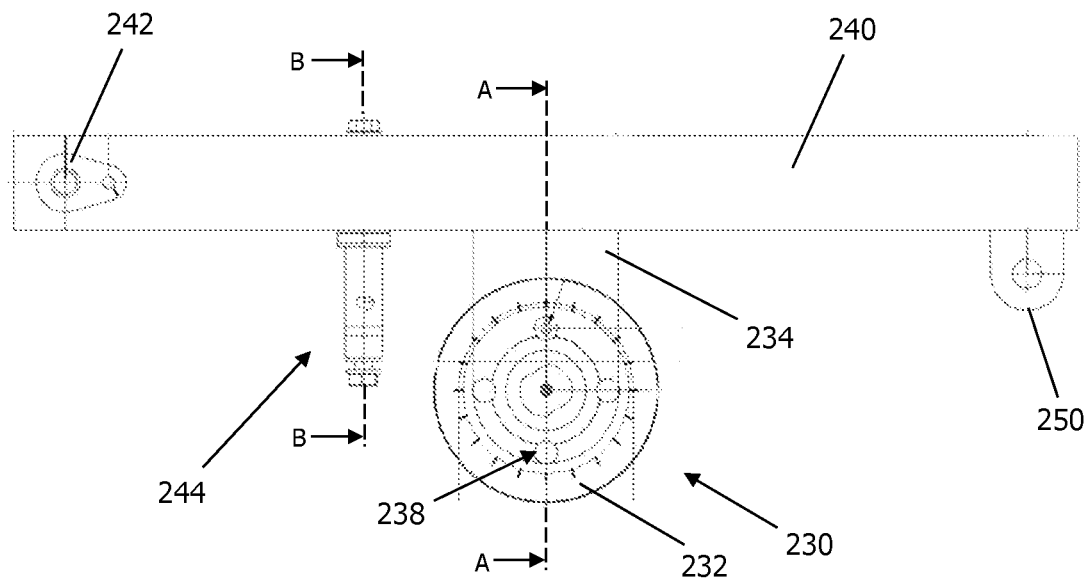
FIG. 5 shows a sensing sheave of the winch of FIG. 2 in isolation.
Figure 6:
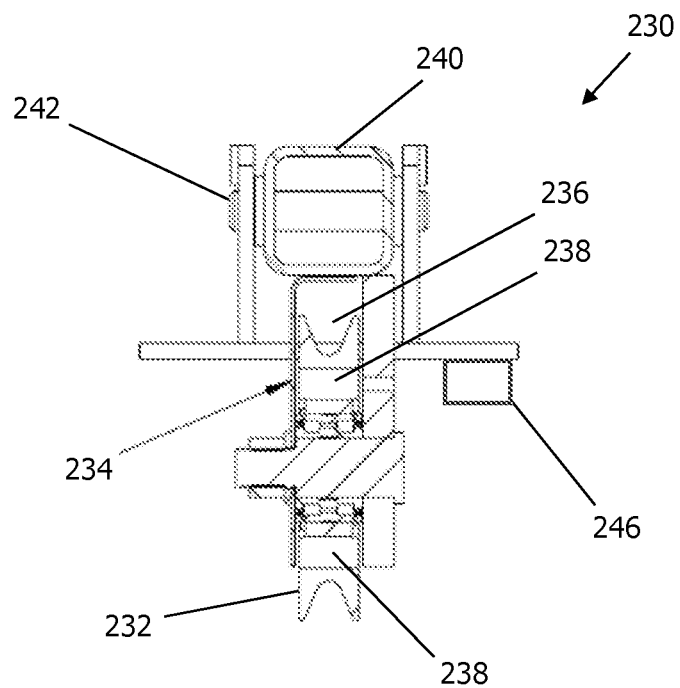
FIG. 6 is a sectional view along the line A-A in FIG. 5.
Figure 7:
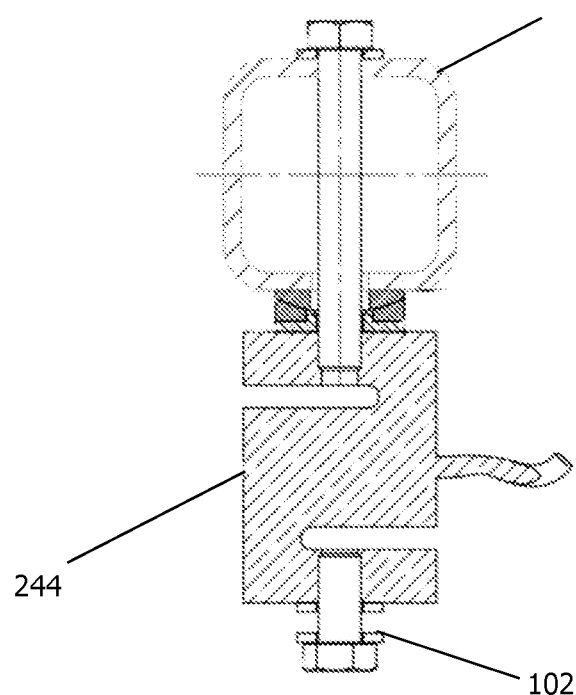
FIG. 7 is a sectional view along the line B-B in FIG. 5.

As depicted in greater detail in FIGS. 5, 6, and 7 the sensing sheave (230) has a pulley wheel (232) and is mounted to a support member (240) on the base frame (102). A load cell (244), shown here as an S-type load cell, is arranged between the support member (240) and the base frame (102). In order to retain the cable in the sensing sheave (230) as it passes around, the sensing sheave (230) has a cable retention plate (234) extending over the pulley wheel (232) substantially enclosing the pulley groove (236). The load cell (244), depicted in cross section in FIG. 7, measures the compressive force between the support member (240) and the base frame (102). This, in turn, is used to measure the tension on the cable as it passes through the sensing sheave (230). The pulley wheel (232) is provided with transverse holes (238) for detection by an optical sensor (246) for measuring the speed of rotation of the pulley wheel (232) as the cable passes through the sensing sheave (230). Via these sensors, i.e. the load cell (244) and optical sensor (246), the sensing sheave (230) is able to accurately measure the tension and speed of the cable as it passes through. The cantilevered lug (250) is used to calibrate the load cell (244) relative to the tension on the cable as it passes over the pulley wheel (232).

The inner and outer alignment sheaves (210, 220) serve to deliver and receive the cable (50) to and from the sensing sheave (230) in parallel opposing directions aligned perpendicular to the axis of rotation of the sensing pulley (230) and aligned with the pulley groove (236). The cable path between the inner alignment sheave (210) and the sensing sheave (230) is parallel to the cable path between the outer alignment sheave (220) and the sensing sheave (230) and is also perpendicular to an axis of rotation of the sensing sheave (230). This provides the most accurate readings from the sensors (244, 246).

As the cable (50) leaves the sensing sheave system (200) in the pay out direction, the cable (50) leaves the outer alignment sheave (220). In the preferred embodiment shown, the cable (50) should exit/enter the outer alignment sheave (220) at an angle of between 0° and 45° to the horizontal, so as to optimise the performance of the sensors (244, 246) in the sensing sheave system (200).

The control system (300) includes a programmable logic controller [PLC] with standard communication and control protocols such as TCP/IP, CAN, Modbus, and analogue voltage and current input and output system. The PLC is in communication with the sensor system (200), the drive system (120), and a human machine interface [HMI]. The HMI may include a remote control unit [RCU] to facilitate remote control operation. The control system (300), via the PLC, receives sensor data from the load cell (244) and the optical sensor (246) in relation to the tension and speed of the cable (50) passing through the sensing sheave system (200). The control system (300), via the PLC, also receives speed and torque data from the drive system (120). When provided with a predetermined target tension (T) for the cable, the control system (300) monitors the tension data being received from the load cell (244) and modulates the speed and/or torque of the drive system (120) to maintain the tension in the cable as close to the target tension (T) as possible.

The control system (300) functions in either a distribution or retrieval mode, with each in either manual or automatic operation. The operator can optionally select manual or automatic mode located on a two-position selector switch on the RCU or HMI.

On selection of distribution mode the level wind (140) moves to the central position relative to the winch spool (110). To achieve this the level wind (140) moves to the full stroke end stop and then moves to a central position based on fixed time movement.

On selection of retrieval mode, the speed of the level wind (140) will be automatically synchronised to the speed of the winch spool (110) to allow even application of cable (50) to the winch spool (110). On commencement of winching operation the level wind (140) position will be set by the operator to allow alignment with the cable (50) on the winch spool (140). This may require the operator to run the level wind (140) for a full cycle until the direction is synchronised with the cable (50) lay arrangement on the winch spool (100). On completion of the first full wrap the level wind (140) speed ratio of the level wind (140) to the winch spool (110) will triple for one cycle. This enables a higher cable (50) wrap pitch to prevent the cable "diving".

By selecting the manual operating mode on the RCU or HMI, operation of the main winch and level wind drive systems (120) can be operated from the RCU and the operator can control the winch spool (110) to a desired line speed for both the retrieval and distribution modes. The operator can select distribution or retrieval mode located on a two-position selector switch on the RCU. In manual mode the tension control variables will be ignored.

An alarm setpoint for torque and drive current can be programmed into the PLC and an audible alarm is activated at the HMI and/or the RCU should the drive achieve high torque or current, alerting the operator to those parameters being exceeded. The RCU is also provided with a safety interlock designed emergency stop latching bush button, allowing the operator to instantly stop operation of the winch in the case of an emergency.

During operation, the operator will input the desired line speed at the RCU via a potentiometer. This data is transmitted to the PLC together with data from the speed and tension sensors (244, 246) and, via a tuneable proportional integral derivative [PID] function, the PLC outputs a signal to the drive system (120) of the winch spool (110) to increase or decrease the speed of the winch spool (110) motor in order to achieve the desired line speed. If the maximum load of the winch spool (110) motor is exceeded an audible alarm will be initiated at the HMI and/or RCU.

In automatic mode, the winch (100) will automatically distribute or retrieve cable (50) based on a tension or speed set-point that is set by the operator and then automatically controlled by the PLC. In either distribution or retrieval mode, the operator will input the desired line speed and/or cable tension at the RCU or HMI to the desired level via two potentiometers. During operation, the PLC will then change the winch spool (110) speed, by increasing/decreasing RPM in order to achieve the relevant speed or tension set point. The desired control state will be managed through a tuneable PID function within the PLC. The user defined tension or speed is able to be changed throughout the operation by increasing or decreasing it at the RCU or HMI.

The maximum allowable tension that the winch (100) can deliver will be determined by the high setpoint set in the PLC. In retrieval mode, if the cable tension process variable exceeds the maximum tension the drive system (120) will automatically slow to a stop position without engaging the brake system (130). An audible alarm will be initiated at both the RCU and HMI when the maximum tension is exceeded.

During retrieval the PLC will automatically override the speed setpoint and vary the speed of the winch spool (110) to achieve the desired tension setpoints within a controllable band width. On reverting back to pure speed control the PLC will return the speed of the winch spool (110) to the selected setpoint through a tuneable ramp up time.

Although the invention has been described with reference to specific examples, it will be appreciated by those skilled in the art that the invention may be embodied in many other forms.

The invention claimed is:

1. A cable winch adapted to deploy and retract a cable during installation of powerline cables on transmission towers, the winch comprising:
   a base frame;
   a spool mounted for rotation on the base frame, the cable being releasably securable to the spool and extending through the cable winch along a cable path;
   a drive system connected to the spool and able to drive rotation of the spool to either pay out or wind in the cable along the cable path;
   a level wind for winding the cable onto or off of the spool;
   a sensor system arranged on the cable path through which the cable passes downstream of the spool, the sensor system being downstream of the level wind and on an opposite side of the spool to the level wind, the sensor system having a first sensor able to detect and output tension data in relation to tension in the cable passing through the sensor system; and
   a control system adapted to receive the tension data output by the sensor system and modulate a speed and a torque of the drive system in order to maintain a predetermined tension in the cable,
   wherein the sensor system includes a sensing sheave associated with the first sensor, the cable passing through the sensing sheave and exerting a force on the first sensor,
   wherein the sensor system includes an inner alignment sheave upstream of the sensing sheave and an outer alignment sheave downstream of the sensing sheave, and
   wherein the cable path between the inner alignment sheave and the sensing sheave is parallel to the cable path between the outer alignment sheave and the sensing sheave and is also perpendicular to an axis of rotation of the sensing sheave.

2. The cable winch of claim 1, wherein the sensing sheave is mounted on a support member and the first sensor is a load cell, wherein the support member is connected to the base frame via the load cell.

3. The cable winch of claim 1, wherein the sensor system comprises a PLC in communication with the sensor system and the drive system and a HMI in communication with the PLC.

4. The cable winch of claim 1, wherein:
   the sensor system further comprises a second sensor able to detect and output speed data in relation to a speed of the cable passing through the sensor system; and
   the control system is adapted to receive the speed data output by the sensor system and modulate the speed of the drive system in order to maintain a predetermined speed of the cable passing through the sensor system.

5. The cable winch of claim 4, wherein the sensing sheave comprises a pulley wheel and the second sensor is used to detect a speed of rotation of the pulley wheel, and the speed of rotation of the pulley wheel indicates the speed of the cable passing through the sensor system.

6. The cable winch of claim 5, wherein the pulley wheel has at least one optical marker and the second sensor is configured to detect the at least one optical marker as the pulley wheel rotates for detecting the speed of rotation of the pulley wheel.

7. The cable winch of claim 6, wherein the at least one optical maker includes a plurality of optical markers, and each optical marker is angularly spaced from an adjacent optical marker.

8. The cable winch of claim 6, wherein the at least one optical marker is a hole.

9. A cable winch adapted to deploy and retract a cable during installation of powerline cables on transmission towers, the winch comprising:
   a base frame;
   a spool mounted for rotation on the base frame, the cable being releasably securable to the spool and extending through the cable winch along a cable path;
   a drive system connected to the spool and able to drive rotation of the spool to either pay out or wind in the cable along the cable path;
   a sensor system arranged on the cable path through which the cable passes downstream of the spool, the sensor system having:
     a first sensor able to detect and output tension data in relation to tension in the cable passing through the sensor system; and
     a second sensor able to detect and output speed data in relation to a speed of the cable passing through the sensor system; and
   a control system adapted to receive the tension data and the speed data output by the sensor system and modulate a speed and a torque of the drive system in order to maintain a predetermined tension in the cable and/or a predetermined speed of the cable passing through the sensor system,
   wherein the sensor system includes a sensing sheave associated with the first sensor, the cable passing through the sensing sheave and exerting a force on the first sensor,
   wherein the sensor system includes an inner alignment sheave upstream of the sensing sheave and an outer alignment sheave downstream of the sensing sheave, and
   wherein the cable path between the inner alignment sheave and the sensing sheave is parallel to the cable path between the outer alignment sheave and the sensing sheave and is also perpendicular to an axis of rotation of the sensing sheave.

10. The cable winch of claim 9, wherein the sensing sheave comprises a pulley wheel and the second sensor is used to detect a speed of rotation of the pulley wheel, and the speed of rotation of the pulley wheel indicates the speed of the cable passing through the sensor system.

11. The cable winch of claim 10, wherein the pulley wheel has at least one optical marker and the second sensor is configured to detect the at least one optical marker as the pulley wheel rotates for detecting the speed of rotation of the pulley wheel.

12. The cable winch of claim 11, wherein the at least one optical maker includes a plurality of optical markers, and each optical marker is angularly spaced from an adjacent optical marker.

13. The cable winch of claim 11, wherein the at least one optical marker is a hole.

14. The cable winch of claim 9, wherein the sensing sheave is mounted on a support member and the first sensor is a load cell, wherein the support member is connected to the base frame via the load cell.

* * * * *